US010791370B1

(12) United States Patent
Viswanathan et al.

(10) Patent No.: US 10,791,370 B1
(45) Date of Patent: Sep. 29, 2020

(54) CONTENT RECOMMENDATION BASED ON GAME PROGRESS

(71) Applicant: Rovi Guides, Inc., San Jose, CA (US)

(72) Inventors: Prakash Viswanathan, Bangalore (IN); Dolphin Masilamany Santha, Bangalore (IN); Rajendran Pichaimurthy, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/370,177

(22) Filed: Mar. 29, 2019

(51) Int. Cl.
*H04N 21/466* (2011.01)
*A63F 13/79* (2014.01)
*H04N 21/442* (2011.01)

(52) U.S. Cl.
CPC ......... *H04N 21/4668* (2013.01); *A63F 13/79* (2014.09); *H04N 21/44204* (2013.01)

(58) Field of Classification Search
None
See application file for complete search history.

(56) References Cited

U.S. PATENT DOCUMENTS

| | | | |
|---|---|---|---|
| 6,954,728 B1 * | 10/2005 | Kusumoto | G06Q 30/02 |
| | | | 705/14.12 |
| 7,101,284 B2 * | 9/2006 | Kake | A63F 13/10 |
| | | | 463/31 |
| 7,761,892 B2 | 7/2010 | Ellis et al. | |
| 9,295,916 B1 * | 3/2016 | Harrington | A63F 13/24 |
| 2004/0015608 A1 * | 1/2004 | Ellis | G06Q 30/02 |
| | | | 709/246 |
| 2005/0246638 A1 * | 11/2005 | Whitten | A63F 13/5375 |
| | | | 715/708 |
| 2006/0135232 A1 * | 6/2006 | Willis | A63F 13/12 |
| | | | 463/1 |
| 2007/0072676 A1 * | 3/2007 | Baluja | A63F 13/61 |
| | | | 463/42 |
| 2007/0078706 A1 * | 4/2007 | Datta | G06Q 30/0261 |
| | | | 705/14.5 |
| 2007/0079326 A1 * | 4/2007 | Datta | G06Q 30/0273 |
| | | | 725/34 |
| 2008/0059304 A1 * | 3/2008 | Kimsey | A63F 13/822 |
| | | | 705/14.12 |
| 2008/0102947 A1 * | 5/2008 | Hays | A63F 13/79 |
| | | | 463/31 |

(Continued)

OTHER PUBLICATIONS

International Search Report and Written Opinion in PCT/US2020/020875 dated Jun. 3, 2020.

*Primary Examiner* — Alexander Q Huerta
(74) *Attorney, Agent, or Firm* — Haley Guiliano LLP

(57) ABSTRACT

Systems and methods for recommending content based on gaming progress are disclosed herein. A gaming log, which is generated based on performance of a video game using a computing device, is received from the computing device over a communication network. The gaming log includes an identifier of a segment of the video game and an attribute of the segment. Control circuitry searches metadata associated with items of content in a database to identify, based on the identifier of the segment or the attribute of the segment, an item of content associated with the segment of the video game. In response to identifying the item of content associated with the segment of the video game, the control circuitry transmits a recommendation of the identified item of content for display via the computing device.

22 Claims, 10 Drawing Sheets

(56) References Cited

U.S. PATENT DOCUMENTS

| | | | |
|---|---|---|---|
| 2011/0184805 A1* | 7/2011 | Margalit | G06Q 30/02 705/14.49 |
| 2011/0302032 A1 | 12/2011 | Ishii | |
| 2012/0047017 A1* | 2/2012 | Hernandez | G06Q 30/0257 705/14.55 |
| 2012/0252574 A1* | 10/2012 | Chow | H04L 67/38 463/31 |
| 2012/0270650 A1* | 10/2012 | Jones | A63F 13/5375 463/31 |
| 2013/0079142 A1* | 3/2013 | Kruglick | A63F 13/79 463/40 |
| 2013/0237318 A1* | 9/2013 | Colaco | A63F 13/12 463/31 |
| 2013/0311308 A1* | 11/2013 | Huang | G06Q 30/0251 705/14.73 |
| 2014/0179441 A1 | 6/2014 | Morrison | |

\* cited by examiner

CONTENT RECOMMENDATION BASED ON GAME PROGRESS

BACKGROUND

The present disclosure relates to systems for content recommendation and, more particularly, to systems and related processes for recommending content based on gaming progress.

SUMMARY

Many games, such as video games, have media content items that are associated with the games. For example, a video game may have an associated movie, television show, animated series, soundtrack, sporting event, tutorial video, or the like. A user's experience playing a video game may be enriched if relevant items of content, such as items of content associated with the video game, were recommended or presented to the user in a timely manner. Technical challenges involved in doing so, however, include how to identify relevant items of content and how to determine when to recommend or present those relevant items of content to the user. Indeed, identifying items of content relevant to video games is made more difficult based on the processing power required to analyze the vast and rapidly growing universe of items of content for relevance to video games. Moreover, items of content are often stored in scattered locations across computer networks, making it difficult even to discover potentially relevant items of content. Additionally, even after items of content are identified as relevant to a video game, it can be difficult to determine when to recommend or present such an item of content to a user, given the vast number of users who play that video game and the widely varied times during which they play the game.

In view of the foregoing, the present disclosure provides systems and related methods that recommend content based on gaming progress. For instance, one such system includes a communication port configured to receive, over a communication network, from a computing device such as a video game console or a smartphone, video game performance data based on performance of a video game using the computing device. The video game performance data, in some instances, is received from the computing device over the communication network in response to termination of an attempt to overcome a challenge in the video game. The system also includes a memory and control circuitry configured to determine, based on a criterion stored in the memory, whether the video game performance data indicates a failure to overcome a challenge in the video game. The control circuitry is further configured to, in response to determining that the video game performance data indicates a failure to overcome the challenge in the video game, identify for recommendation an item of content associated with the challenge and transmit a recommendation of the identified item of content for display via the computing device. In this manner, for example, the system may recommend or present an item of content that is relevant to the particular challenge with which the user is having difficulty in a timely manner—at a time when the user is having such difficulty.

In some examples, the video game performance data includes a number of unsuccessful attempts made to overcome the challenge using a user account, and the criterion includes a minimum number of unsuccessful attempts to overcome the challenge that indicates a failure to overcome the challenge. In such examples, the control circuitry is configured to determine whether the video game performance data indicates the failure to overcome the challenge in the video game by determining whether the number of unsuccessful attempts made to overcome the challenge using the user account meets or exceeds the minimum number.

In another aspect, the control circuitry is configured to determine, based on the video game performance data, that the video game performance data includes multiple portions that correspond to multiple user accounts, respectively. The control circuitry then identifies multiple items of content to be recommended based on the multiple portions, respectively, and transmits the identified items of content for display via the computing device.

In various aspects, the item of content associated with the challenge includes various types of content. For example, the item of content associated with the challenge may include video content that is received over the communication network in association with a second user account, distinct from a first user account associated with the video game performance data, showing a performance of the video game in which the challenge was overcome. The item of content may be received from a second computing device over the communication network automatically in response to completion of the performance of the video game in which the challenge was overcome. In this manner, for instance, the system is configured to maintain up-to-date data on items of content relevant to video game challenges as such items of content are made available, for instance, by being uploaded to a server or website by other users.

In another example, the control circuitry is configured to determine whether a content recommendation setting is enabled for a user account associated with the video game performance data. In such an example, the control circuitry is further configured to transmit the recommendation of the identified item of content for display via the computing device in response to the determination that the content recommendation setting is enabled for the user account.

In a further aspect, the video game performance data includes an identifier of the game and an identifier of the challenge, and the control circuitry is configured to identify the item of content associated with the challenge further by querying a content database to identify the item of content that corresponds to the identifier of the game and the identifier of the challenge.

The control circuitry, in some examples, is configured to identify for recommendation the item of content associated with the challenge by identifying for recommendation the item of content having a highest rank among a plurality of items of content stored in a database and associated with the challenge. The control circuitry, in still other aspects, is configured to identify for recommendation the item of content associated with the challenge by identifying for recommendation the item of content having a most recent upload timestamp from among a plurality of items of content stored in a database and associated with the challenge.

In accordance with another aspect, the present disclosure provides additional systems and related methods that recommend content based on a gaming log. For instance, one such system includes a communication port configured to receive, over a communication network, from a computing device such as a video game console or a smartphone, a gaming log generated based on performance of a video game using the computing device. The gaming log includes an identifier of a segment of the video game and an attribute of the segment. The system also includes control circuitry configured to search metadata associated with items of content in a database to identify, based on the identifier of the segment or the attribute of the segment, an item of content associated with the segment of the video game. In this manner, for instance, the system is configured to continuously or periodically identify and store relationships or other indications of relevance between video games or portions of video games and their related items of content. By aggregating and processing gaming logs for video games and metadata for other items of content, the system can identify relevance between video games and items of content that would otherwise be difficult to identify. This results in a seamless integration between a video gaming environment and the environments of other sources of content. Once the control circuitry has identified the item of content associated with the segment of the video game, the control circuitry transmits a recommendation of the identified item of content, or the item of content itself, for presentation via the computing device.

In some aspects, the attribute of the segment includes an identifier of the video game, and the control circuitry is configured to search the metadata to identify the item of content associated with the segment of the video game by searching the database for the item of content associated with the identifier of the video game. In such aspects, the item of content may include a video clip from a movie or television show associated with the segment of the video game.

In another example, the attribute of the segment includes an identifier of a character associated with the segment, and the control circuitry is configured to search the metadata to identify the item of content by searching the database for the item of content associated with the identifier of the character associated with the segment. In such an example, the item of content may include a video clip featuring the character associated with the segment of the video game.

The attribute of the segment, as another example, includes an identifier of a scene associated with the segment, and the control circuitry is configured to search the metadata to identify the item of content by searching the database for the item of content associated with the identifier of the scene associated with the segment. In such an example, the item of content associated with the segment of the video game may include a video clip of the scene from a movie or television show associated with the segment.

In a further example, the attribute of the segment includes an identifier of a sport associated with the segment, and the control circuitry is configured to search the metadata to identify the item of content by searching the database for the item of content associated with the identifier of the sport associated with the segment of the video game. The item of content associated with the segment of the video game, in such an example, may include a video clip featuring the sport associated with the segment.

In some aspects, the control circuitry is configured to receive, over the communication network, selection of the recommended item of content and, in response to receiving the selection of the recommended item of content, transmit the recommended item of content for display via the computing device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
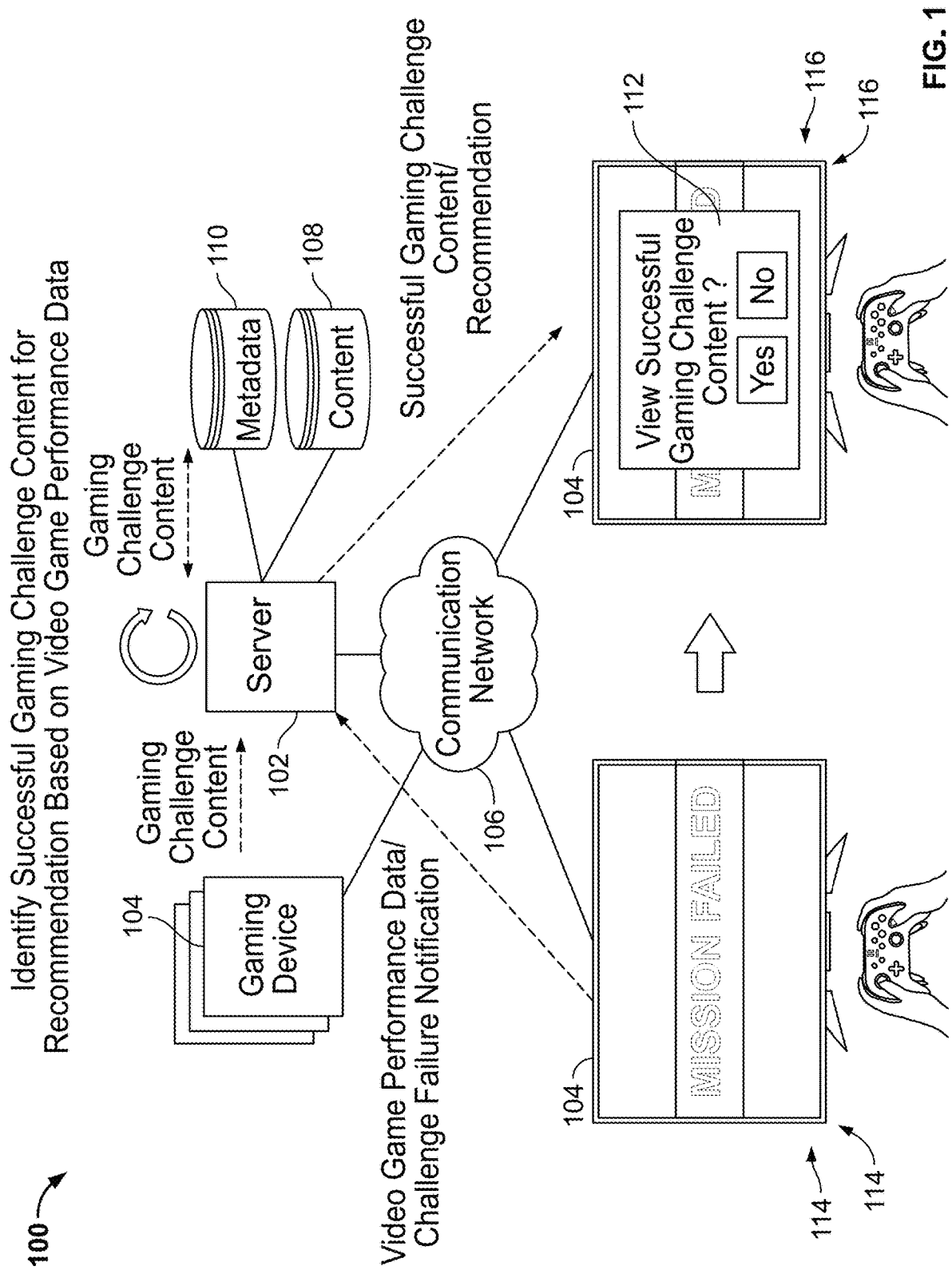
FIG. 1 shows an illustrative block diagram of a system for recommending content based on gaming progress, in accordance with some embodiments of the disclosure.

FIG. 1 shows an illustrative block diagram of system 100 for recommending content based on gaming progress, in accordance with some embodiments of the disclosure. System 100 includes server 102, gaming devices 104, communication network 106, content source or database 108, and metadata database 110. Server 102 is communicatively coupled to gaming devices 104 by way of communication network 106 and is communicatively coupled to content source 108 and metadata database 110 by way of additional communication paths, which may be included in communication network 106 or may be separate from communication network 106. Communication network 106 may be any type of communication network, such as the Internet, a mobile phone network, mobile voice or data network (e.g., a 4G or LTE network), cable network, public switched telephone network, or any combination of two or more of such communication networks. Communication network 106 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 108 communicatively couples various components of system 100 to one another.

Server 102 is configured to aggregate over communication network 106, from a variety sources, such as users of gaming devices 104, content that helps users overcome video gaming challenges. For example, server 102 may receive content, such as challenge tutorials or video clips of actual game play uploaded by other users of gaming devices 104, that shows those users successfully overcoming various challenges in particular video games or segments thereof. Server 102 is also configured to detect when another user of a gaming device 104 has failed to overcome a challenge in a video game and/or is facing difficulty overcoming a challenge in the video game and would thus benefit from viewing tutorials, video clips, or likewise helpful content. For instance, in view 114, upon failure of a user of gaming device 104 to overcome a challenge within a video game, gaming device 104 transmits video game performance data, which includes a gaming challenge failure notification, to server 102 by way of communication network 106. In response to detecting that the user of gaming device 104 has failed to overcome a challenge in a video game and/or is facing difficulty overcoming a challenge in the video game, server 102 is configured to provide or recommend to the user via their gaming device 104 content that may help that user overcome the challenge. For example, server 102 may search content source 108 and/or metadata 110 to identify an item of content related to the particular challenge the user has failed to overcome and provide, to gaming device 104 over communication network 106, a selectable recommendation, such as the popup window 112 in view 116, that a user may select to view any such identified item of content. Additional details regarding the features and functionality of system 100 are provided below.

Figure 2:
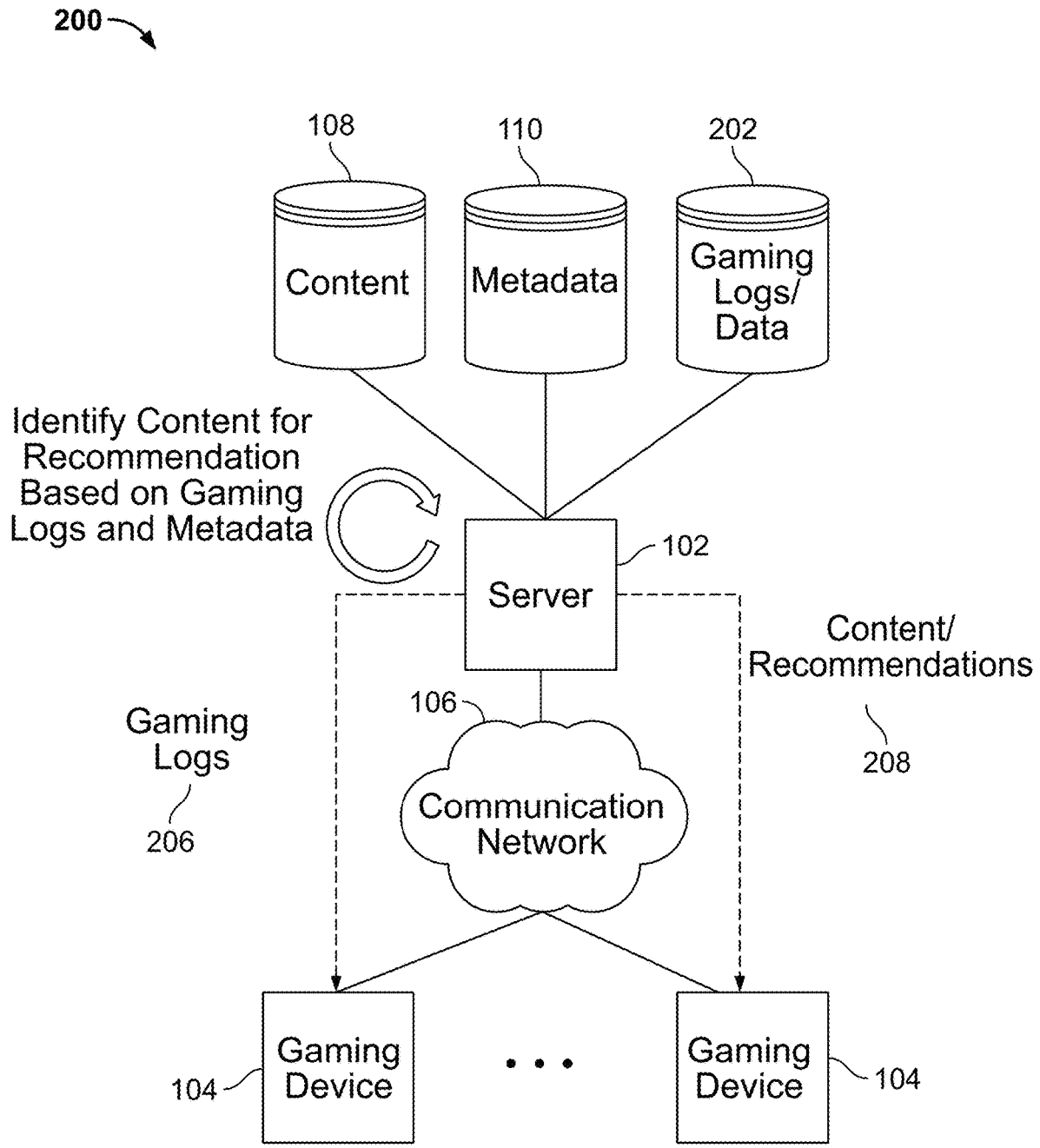
FIG. 2 shows an illustrative block diagram of a system for recommending content based on a gaming log, in accordance with some embodiments of the disclosure.

FIG. 2 shows an illustrative block diagram of system 200 for recommending content based on gaming logs, in accordance with some embodiments of the disclosure. In various embodiments, system 200 includes some components described above in connection with system 100. In particular, system 200 includes server 102, gaming devices 104, communication network 106, content source 108, metadata database 110, and gaming log database 202. Although FIG. 2 shows content source 108, metadata database 110, and gaming log database 202 as individual components and as separate from server 102, in some embodiments, any of those components may be combined and/or integrated as one device with server 102. Server 102 is communicatively coupled to gaming devices 104 by way of communication network 106 and is communicatively coupled to content source 108, metadata database 110, gaming log database 202 by way of additional communication paths, which may be included in communication network 106 or may be separate from communication network 106. Server 102 is configured to aggregate from gaming devices 104 over communication network 106 gaming logs 206 generated based on performance of video games using gaming devices 104 while logged into user accounts. The gaming logs 206 may be pushed by gaming devices 104 to server 102 and/or pulled by server 102 from gaming devices 104. Gaming logs 206 may include, for example, data indicating particular video games played, levels of those video games, successes and failures at challenges in video games, as well as characters, scenes, sports, or the like that are associated with particular segments of video games. Server 102 is configured to process gaming logs 206 by comparing the data therein to metadata stored in metadata database 110 to identify one or more items of content, such as content in content source 108, that are associated with particular video game segments. Server 102, in some embodiments, stores gaming logs 206 and/or associations between game data (e.g., video game segment identifiers or the like) and associated metadata or content identifiers. In this manner, server 102 is configured to recommend, and/or provide for user consumption, via gaming devices 104, such associated content at a time near (e.g., shortly before, during, or after) a time when the user plays the video game segment associated with the content. For example, if a user is playing a Harry Potter game involving a particular scene from a Harry Potter movie, server 102 may determine that and transmit a recommendation to gaming device 104 that the user view a clip from that movie scene. Server 102 may also retrieve the clip from the movie scene from content source 108 and transmit it to gaming device 104 for playback. System 200 thus facilitates recommendations of content that are timelier and more relevant than those possible with prior systems.

Figure 3:
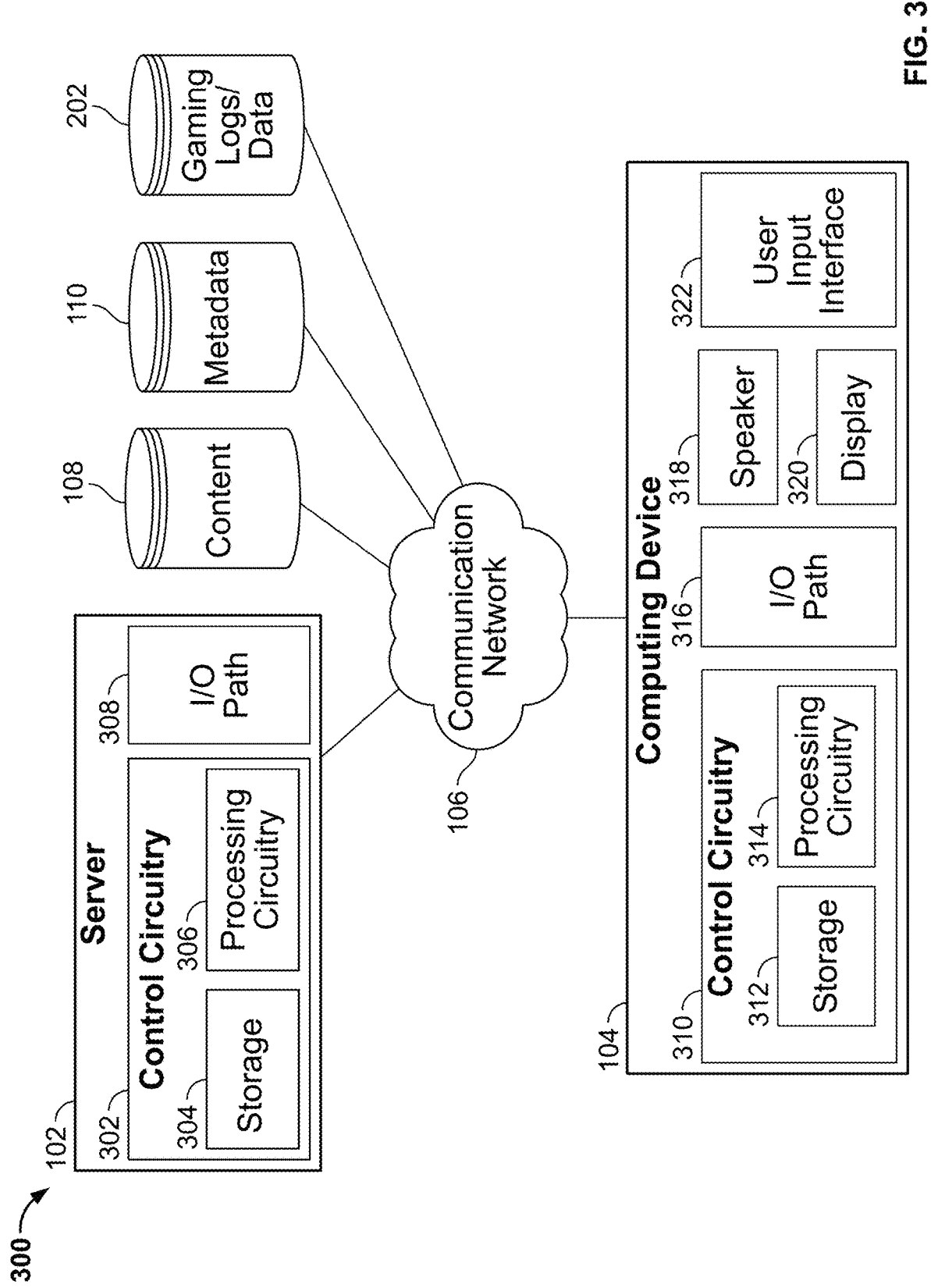
FIG. 3 shows an illustrative block diagram showing additional details of the systems of FIG. 1 and/or FIG. 2, in accordance with some embodiments of the disclosure.

FIG. 3 is an illustrative block diagram showing additional details of system 100 (FIG. 1) and/or system 200 (FIG. 2), in accordance with some embodiments of the disclosure. In various embodiments, system 200 includes some components described above in connection with system 100. Although FIG. 3 shows certain numbers of components, in various examples, system 300 may include fewer than the illustrated components and/or multiples of one or more illustrated components. Server 102 includes control circuitry 302 and I/O path 308, and control circuitry 302 includes storage 304 and processing circuitry 306. Computing device 104, which may correspond to gaming device 104 of FIG. 1 and FIG. 2, may be a gaming device, such as a video game console, user television equipment such as a set-top box, user computer equipment, a wireless user communications device such as a smartphone device, or any device on which video games may be played. Computing device 104 includes control circuitry 310, I/O path 316, speaker 318, display 320, and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 300 (e.g., storages of content source 108, metadata database 110, gaming log database 202, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 300 may be used to store various types of content, metadata, gaming data, media guidance data, and or other types of data. Non-volatile memory may also be used (e.g., to launch a boot-up routine and other instructions). Cloud-based storage may be used to supplement storages 304, 312 or instead of storages 304, 312. In some embodiments, control circuitry 302 and/or 310 executes instructions for an application stored in memory (e.g., storage 304 and/or 312). Specifically, control circuitry 302 and/or 310 may be instructed by the application to perform the functions discussed herein. In some implementations, any action performed by control circuitry 302 and/or 310 may be based on instructions received from the application. For example, the application may be implemented as software or a set of executable instructions that may be stored in storage 304 and/or 312 and executed by control circuitry 302 and/or 310. In some embodiments, the application may be a client/server application where only a client application resides on computing device 104, and a server application resides on server 102.

The application may be implemented using any suitable architecture. For example, it may be a stand-alone application wholly implemented on computing device 104. In such an approach, instructions for the application are stored locally (e.g., in storage 312), and data for use by the application is downloaded on a periodic basis (e.g., from an out-of-band feed, from an Internet resource, or using another suitable approach). Processing circuitry 314 may retrieve instructions for the application from storage 312 and process the instructions to perform the functionality described herein. Based on the processed instructions, processing circuitry 314 may determine what action to perform when input is received from user input interface 322.

In client/server-based embodiments, control circuitry 310 may include communication circuitry suitable for communicating with an application server (e.g., server 102) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 106). In another example of a client/server-based application, control circuitry 310 runs a web browser that interprets web pages provided by a remote server (e.g., server 102). For example, the remote server may store the instructions for the application in a storage device. The remote server may process the stored instructions using circuitry (e.g., control circuitry 302) and generate the displays discussed above and below. Computing device 104 may receive the displays generated by the remote server and may display the content of the displays locally via display 320. This way, the processing of the instructions is performed remotely (e.g., by server 102) while the resulting displays, such as the display windows described elsewhere herein, are provided locally on computing device 104. Computing device 104 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a gaming controller, a remote control, trackball, keypad, keyboard, touchscreen, touchpad, stylus input, joystick, voice recognition interface, or other user input interfaces. User input interface 322 may be integrated with or combined with display 320, which may be a monitor, a television, a liquid crystal display (LCD), an electronic ink display, or any other equipment suitable for displaying visual images.

Server 102 and computing device 104 may receive content and data via input/output (hereinafter "I/O") paths 308 and 316, respectively. For instance, I/O path 316 may include a communication port configured to receive a live content stream from server 102 and/or content source 108 via a communication network 106. Storage 312 may be configured to buffer the received live content stream for playback, and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Content source 108 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Content source 108 may be the originator of content (e.g., a television broadcaster, a Webcast provider, etc.) or may not be the originator of content (e.g., an on-demand content provider, an Internet provider of content of broadcast programs for downloading, etc.). Content source 108 may include cable sources, satellite providers, on-demand providers, Internet providers, over-the-top content providers, or other providers of content. Content source 108 may also include a remote media server used to store different types of content (e.g., including video content selected by a user) in a location remote from computing device 104. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content and/or data delivered to computing device 104 may be over-the-top (OTT) content. OTT content delivery allows Internet-enabled user devices, such as computing device 104, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google LLC; Netflix is a trademark owned by Netflix, Inc.; and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 104.

Figure 4:
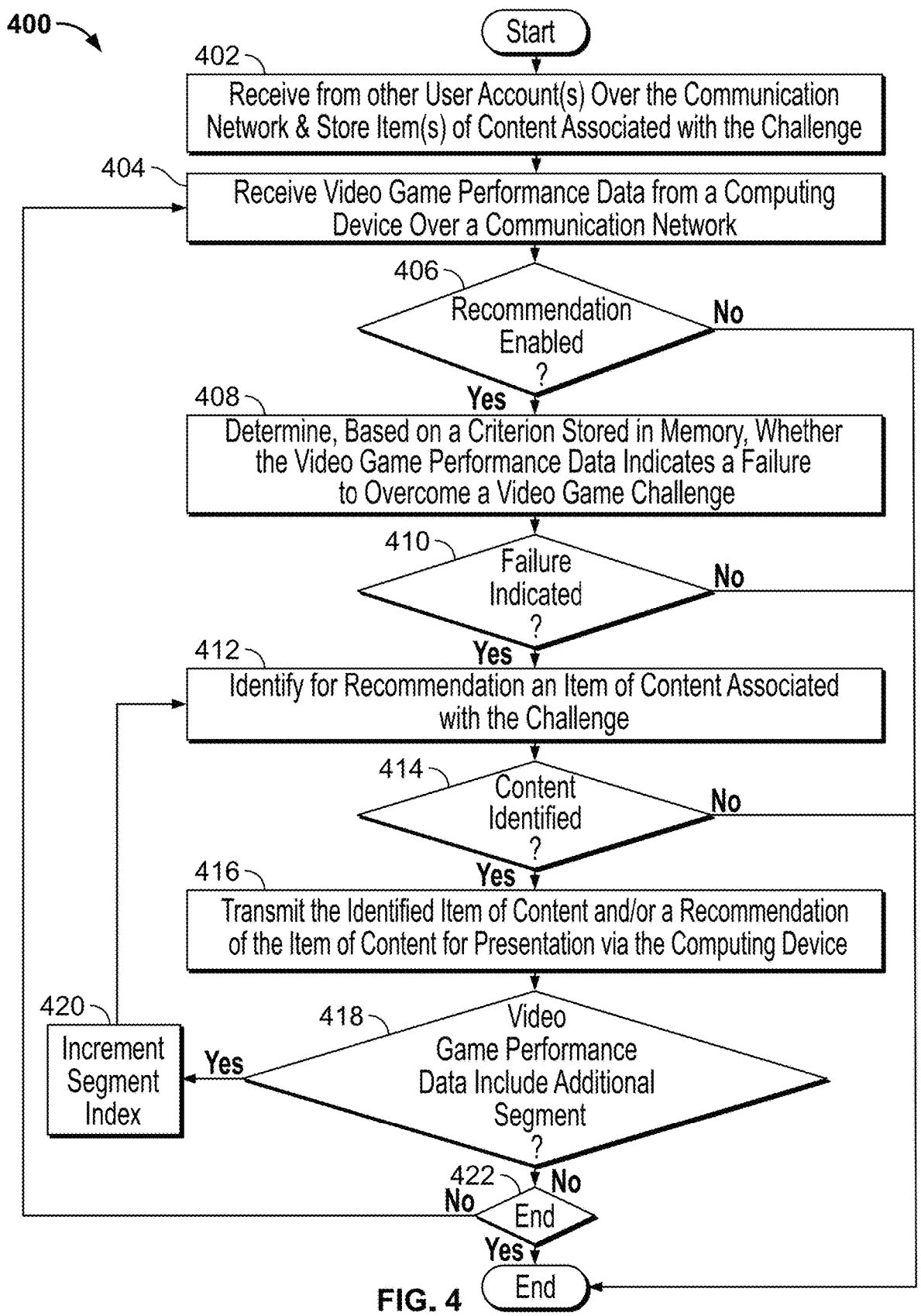
FIG. 4 depicts an illustrative flowchart of a process for recommending content based on gaming progress, in accordance with some embodiments of the disclosure.

Having described system 100, reference is now made to FIG. 4, which depicts an illustrative flowchart of process 400 for recommending content based on gaming progress that may be implemented by using system 300, in accordance with some embodiments of the disclosure. In various embodiments, individual steps of process 400, or any process described herein, may be implemented by one or more components of system 300. Although the present disclosure may describe certain steps of process 400 (and of other processes described herein) as being implemented by certain components of system 300, this is for purposes of illustration only, and it should be understood that other components of system 300 may implement those steps instead.

At 402, control circuitry 302 receives, from computing devices 104 associated with various user accounts over communication network 106, content associated with various gaming challenges, such as tutorials showing how to overcome challenges, video clips of those users successfully overcoming those challenges, or the like. Control circuitry 302 stores the content received at 402 in content database 108. At 404, control circuitry 302 receives, from computing device 104 over communication network 106, video game performance data associated with another user account. Video game performance data may generally include any type of data related to performance of a video game. Example types of data that may be included in video performance data are described below, in connection with FIG. 8, as types of data that may also be included in gaming logs. In some examples, at 406, control circuitry 302 determines whether an automatic recommendation setting is enabled for computing device 104 and/or for the user account associated therewith. For example, control circuitry 302 may ping control circuitry 310 to determine whether the automatic recommendation setting is enabled and/or may store that information in storage 304, in gaming log database 202, or in another storage. If recommendation is disabled ("NO" at 406), then the procedure 400 terminates. If recommendation is enabled ("YES" at 406), then control passes to 408, at which control circuitry 302 determines, based on one or more criteria stored in storage 304, whether the video game performance data received at 402 indicates a failure to overcome a video game challenge. Additional details on how control circuitry 302 may make the determination at 408 are provided below in connection with FIG. 5.

If the video game performance data received at 402 does not indicate a failure to overcome a video game challenge ("NO" at 410), then procedure 400 terminates. If the video game performance data received at 402 indicates a failure to overcome a video game challenge ("YES" at 410), then control is passed to 412, at which control circuitry 302 searches content database 108 and/or metadata database 110 to identify for recommendation an item of content associated with the challenge that the user has failed to overcome. For example, control circuitry 302 may match a video game segment or challenge identifier included in the video game performance data to metadata in metadata database 110, which corresponds to an item of content in content database 108. If control circuitry 302 fails to identify an item of content associated with the challenge ("NO" at 414), then procedure 400 terminates. If control circuitry 302 identifies one or more items of content associated with the challenge ("YES" at 414), then control passes to 416, at which control circuitry 302 transmits the identified item of content, or a recommendation thereof, to computing device 104 for presentation to the user (e.g., via a pop-up window, such as 112 in FIG. 1).

At 418, control circuitry 302 determines whether the video game performance data includes any additional segments, such as a segment corresponding to another video game challenge. If the video game performance data does not include an additional segment ("NO" at 418), then procedure 400 terminates. If the video game performance data includes an additional segment ("YES" at 418), then control circuitry 302 increments a segment index at 420 and the steps of 412, 414, 416, and 418 are repeated to identify an item of content for recommendation based on the additional video game segment or challenge in the manner described above.

Figure 5:
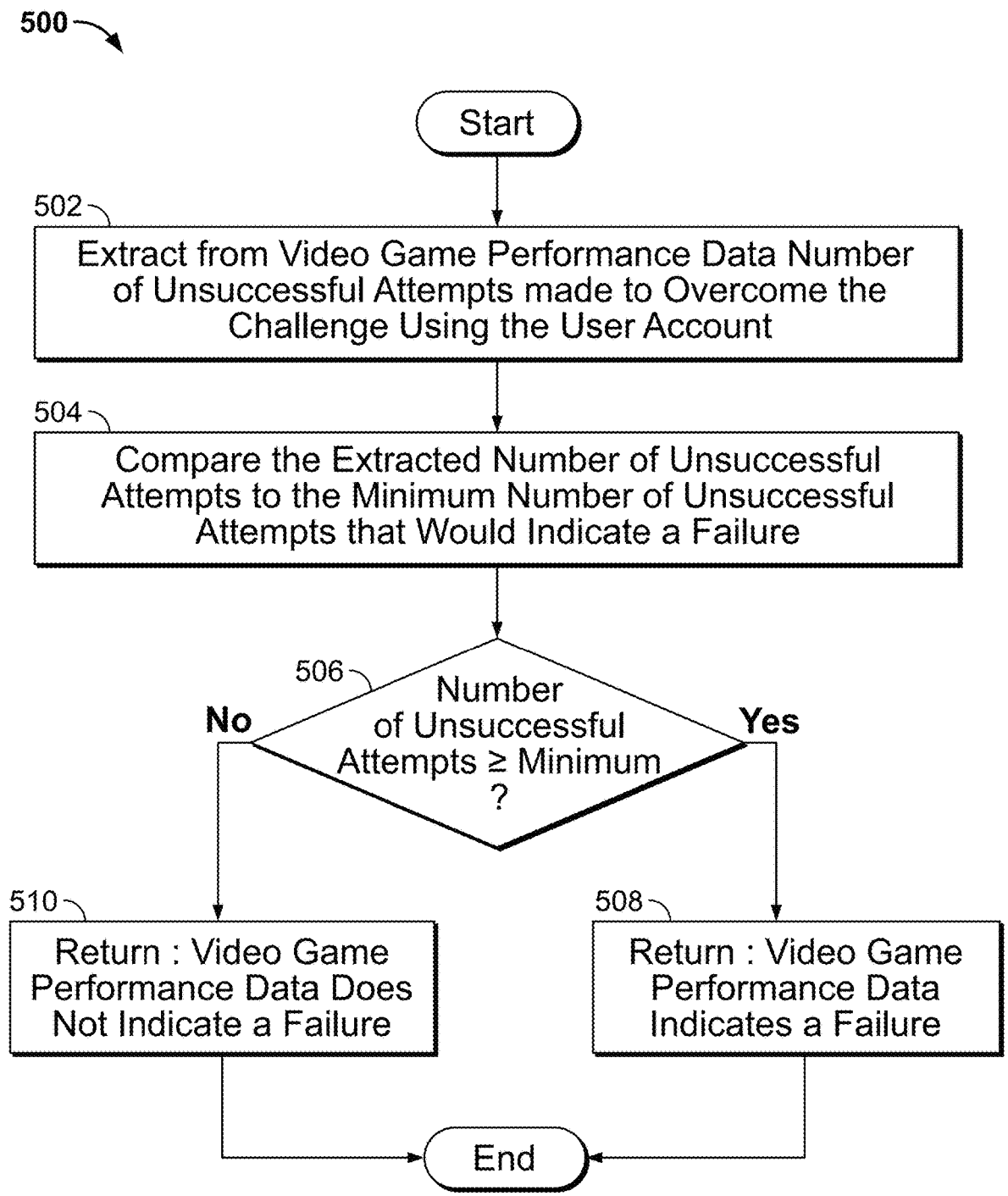
FIG. 5 depicts an illustrative flowchart of a process for determining whether video game performance data indicates a failure to overcome a challenge, in accordance with some embodiments of the disclosure.

FIG. 5 depicts an illustrative flowchart of a process 500 for determining whether video game performance data indicates a failure to overcome a challenge, in accordance with some embodiments of the disclosure. Process 500, in various embodiments, may correspond to step 408 of FIG. 4. At 502, control circuitry 302 extracts from the video game performance data received at 404 a number of unsuccessful attempts made to overcome the challenge under the particular user account associated with the video game performance data. At 504, control circuitry 302 retrieves from storage 304 a threshold or minimum number of unsuccessful attempts that would indicate a failure and compares the threshold to the number of unsuccessful attempts extracted from the video game performance data at 502. If the number of unsuccessful attempts extracted from the video game performance data at 502 meets or exceeds the threshold ("YES" at 506), then at 508 control circuitry 302 returns an output indicating that the video game performance data indicates a failure to overcome the challenge. If the number of unsuccessful attempts extracted from the video game performance data at 502 does not meet or exceed the threshold ("NO" at 506), then at 510 control circuitry 302 returns an output indicating that the video game performance data does not indicate a failure to overcome the challenge.

Figure 6:
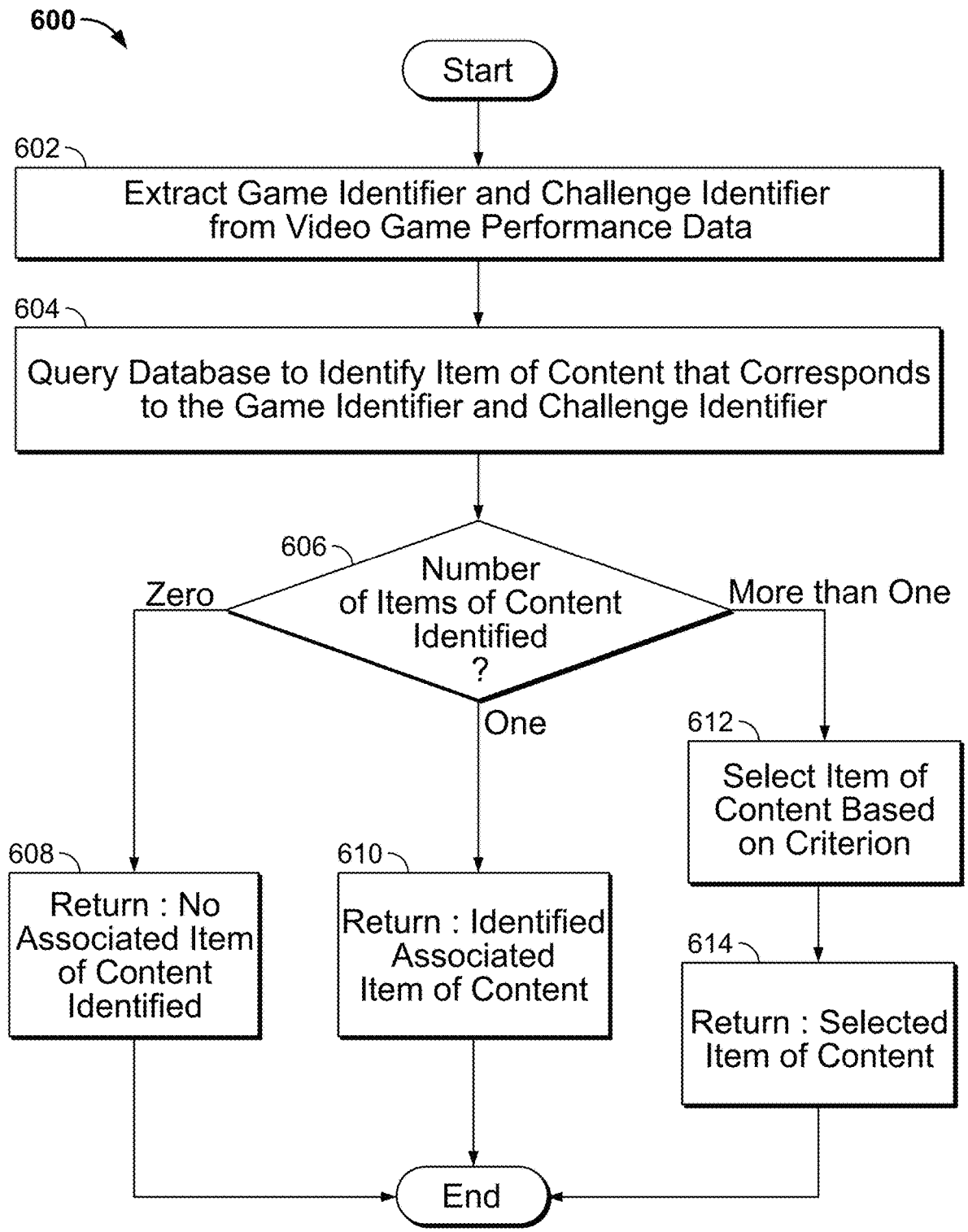
FIG. 6 depicts an illustrative flowchart of a process for identifying for recommendation an item of content associated with a gaming challenge, in accordance with some embodiments of the disclosure.
Figure 7:
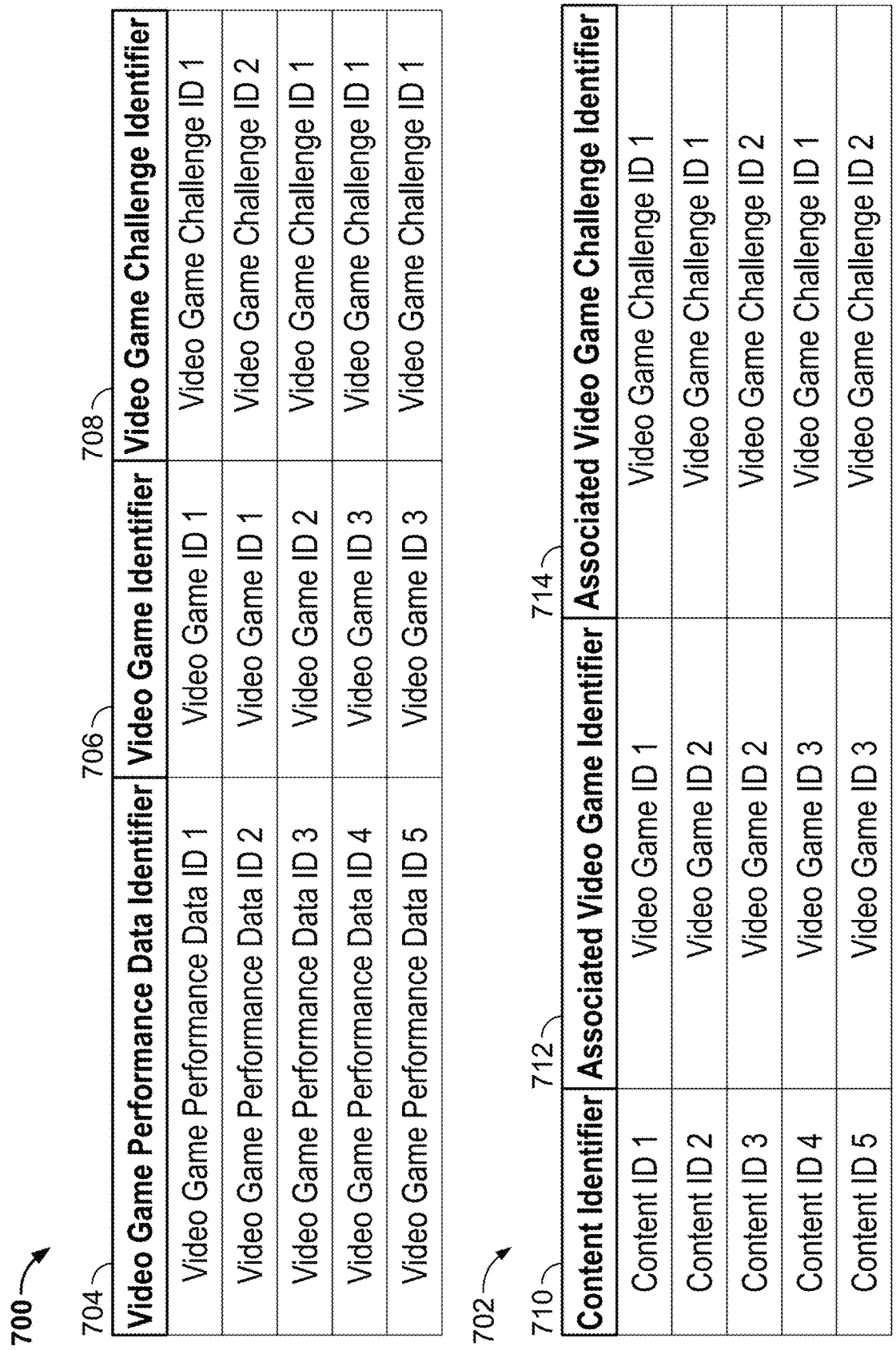
FIG. 7 depicts example data structures for video game performance data and content metadata, in accordance with some embodiments of the disclosure.

FIG. 6 depicts an illustrative flowchart of a process 600 for identifying for recommendation an item of content associated with a gaming challenge, in accordance with some embodiments of the disclosure. Process 600, in various embodiments, may correspond to step 412 of FIG. 4. The video game performance data received at 404, in some examples, includes information that enables server 102 to identify one or more particular challenges associated with the video game performance data. For instance, FIG. 7 shows an example data structure 700 of video game performance data items that may be received at 404. Each video game performance data item includes a video game performance data identifier 704 (e.g., which uniquely identifies an individual packet of received video game performance data), a corresponding video game identifier 706 (e.g., which uniquely identifies a game with which the video game performance data is associated), and a video game challenge identifier 708 (e.g., which uniquely identifies a particular video gaming challenge with which the video game performance data is associated). Metadata database 110, in various embodiments, stores data that enables server 102 to identify items of content in content database 108 that are associated with particular video games and/or video game challenges. For instance, FIG. 7 also shows an example data structure 702 of metadata that may be stored in metadata database 110 in connection with items of content that may be stored in content database 108 (e.g., tutorial videos on challenges, game play video clips showing other users overcoming challenges, or other such items of content received at 402). Each item of content having an entry in the metadata data structure 702 includes a content identifier 710 (e.g., that uniquely identifies the item of content) as well as a video game identifier 712 (e.g., which uniquely identifies the video game to which the item of content corresponds) and a video game challenge identifier 714 (e.g., which uniquely identifies the video game challenge to which the item of content corresponds). In one example, control circuitry 302 utilizes the video game performance data structure 700 and the data structure 702 of metadata as part of procedure 600 to identify an item of content associated with a gaming challenge.

At 602, control circuitry 302 extracts a game identifier and a challenge identifier from the video game performance data received at 404. At 604, control circuitry 302 queries metadata database 110 to identify an item of content that corresponds to the game identifier and the challenge identifier extracted at 602. For instance, control circuitry 302 may search metadata database 110 for metadata that matches the game identifier and the challenge identifier extracted at 602, and the content identifier for the item of content that corresponds to that metadata. Procedure 600 proceeds in different manners depending upon the number, if any, of items of content identified at 604 as corresponding to the game identifier and challenge identifier extracted at 602. If no item of content is identified ("ZERO" at 606), then at 608 control circuitry 302 returns data indicating that no item of content has been identified as corresponding to the game and challenge with which the video game performance data is associated. If a single item of content is identified ("ONE" at 606), then at 610 control circuitry 302 returns the content identifier for the item of content that has been identified as corresponding to the game and challenge with which the video game performance data is associated. If more than one item of content is identified as corresponding to the game and challenge with which the video game performance data is associated ("MORE THAN ONE" at 606), then at 612 control circuitry 302 selects one of the identified items for recommendation based on one or more criterion. For example, control circuitry 302 may select the item of content having a highest rank, most recent upload timestamp, most views, and/or highest degree of popularity among the identified items of content. At 614, control circuitry 302 returns the content identifier for the item of content that has been selected at 612.

Figure 8:
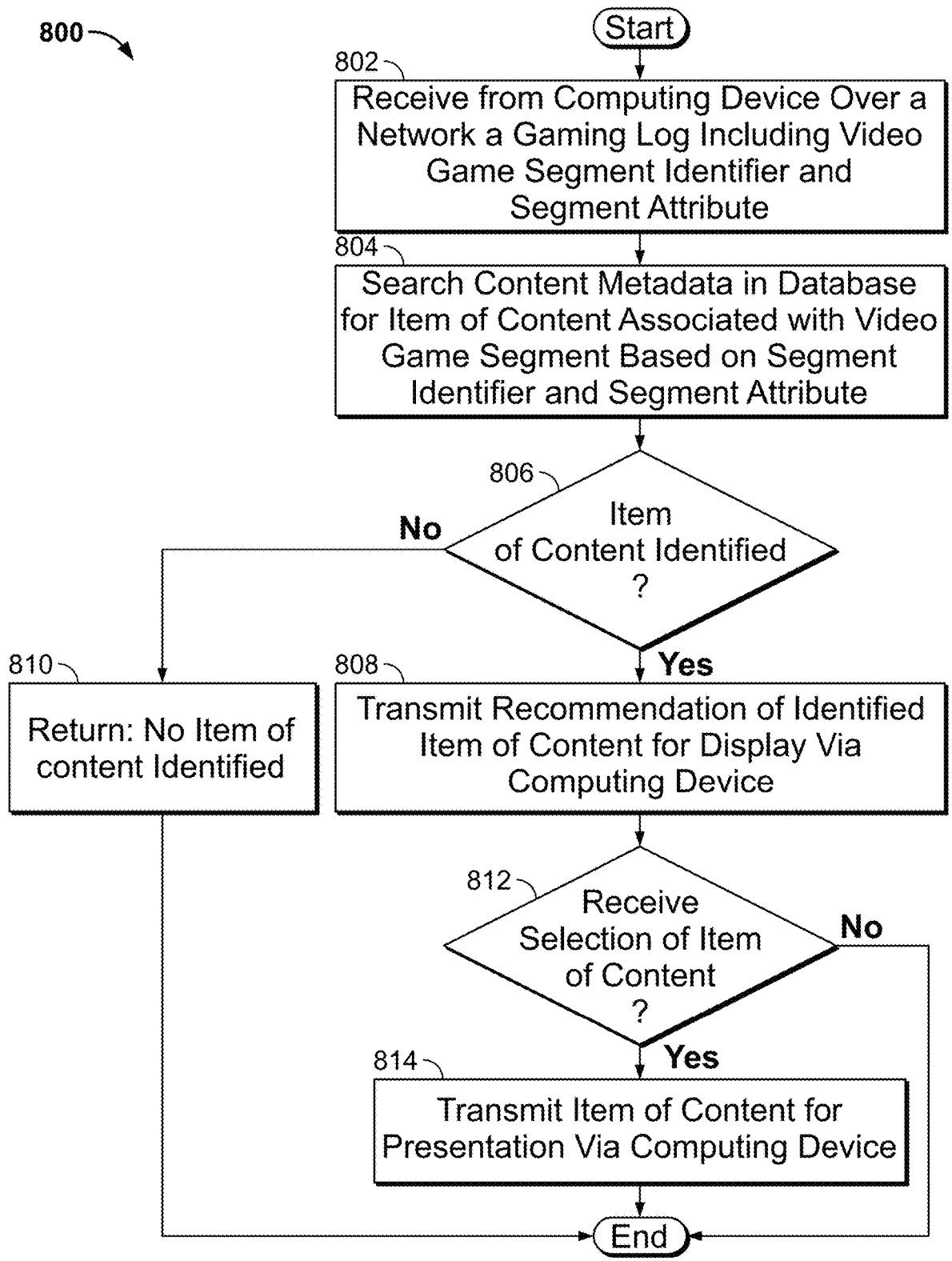
FIG. 8 depicts an illustrative flowchart of a process for recommending content based on a gaming log, in accordance with some embodiments of the disclosure.

FIG. 8 depicts an illustrative flowchart of a process 800 for recommending content based on a gaming log, in accordance with some embodiments of the disclosure. In various embodiments, individual steps of process 800 may be implemented by one or more components of system 300. Although the present disclosure may describe certain steps of process 800 (and of other processes described herein) as being implemented by certain components of system 300, this is for purposes of illustration only, and it should be understood that other components of system 300 may implement those steps instead.

Although not shown in FIG. 8, in various embodiments, prior to step 802 of procedure 800, control circuitry 302 receives, from various computing devices 104 over communication network 106, multiple gaming logs, each including a video game segment identifier and a segment attribute identifier and/or other types of data generated based on the playing of video games via computing device 104. In various embodiments, the gaming logs are received (e.g., individually or in batches, periodically or continuously, as triggered by a content release, a broadcast date/time, or the like) from gaming devices 104 and then aggregated and stored in gaming log database 202 (e.g., as part of gaming log profiles that correspond to user accounts, respectively) for use in associating segments of video games with corresponding other types of content, such as movie clips, sport clips, or the like.

As also not shown in FIG. 8, control circuitry 302 in various embodiments aggregates content related to video game segments and stores the content in content database 108 and stores corresponding metadata in metadata database 110 on an ongoing basis so control circuitry 302 can provide relevant up-to-date content for recommendation or consumption via computing device 104. For instance, control circuitry 302 may periodically or continuously scrape multiple content sources available over communication network 106 for items of content. In another example, control circuitry 302 is configured to monitor a variety of sources, such as television broadcast sources, for release of content to trigger the aggregation of that content and metadata. In this manner, for instance, control circuitry 302 may update content database 108 with a recently broadcast sport game highlight, a recently aired television show episode, or the like for future possible recommendation promptly after its release. For example, control circuitry 302 may detect that an item of content has been released and, in response to detecting that the item of content has been released, store the item of content in content database 108 in association with a unique content identifier, and store in metadata database 110 the content identifier and metadata associated with the item of content for use in the identifying that the item of content is associated with one or more particular segments of video games. This improves the ability of system 300 to provide timely and relevant content and/or content recommendations to computing device 104.

Figure 10:
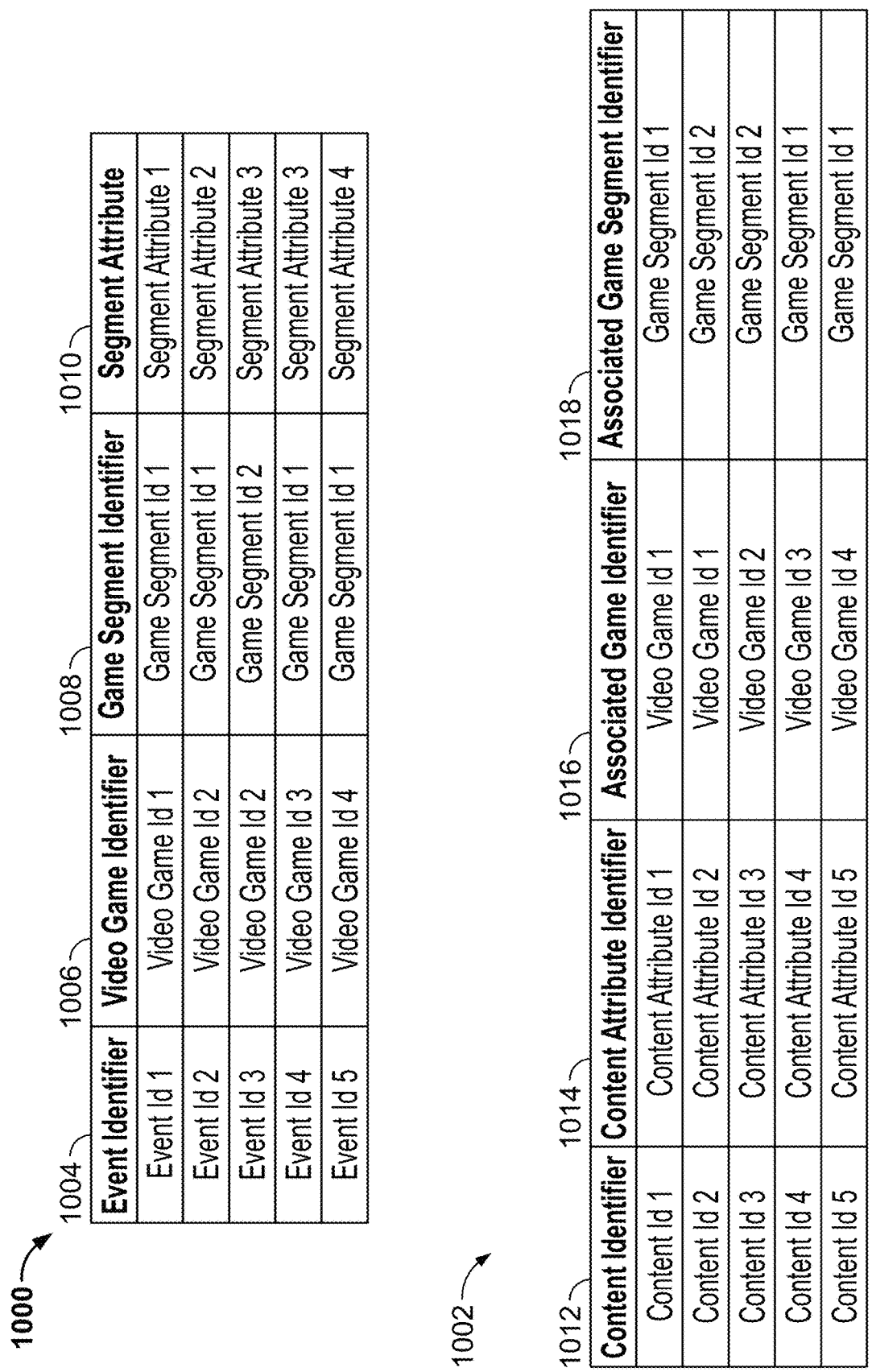
FIG. 10 depicts example data structures for a gaming log and content metadata, in accordance with some embodiments of the disclosure.

An example data structure 1000 for a gaming log that may be received is shown in FIG. 10. Each item of data in the gaming log 1000 includes an event identifier 1004 (e.g., uniquely identifying an event, such as a successful completion of a gaming challenge or milestone that occurred during the course of game play via computing device 104), a video game identifier 1006 (e.g., uniquely identifying the video game with which the event or data item is associated), a game segment identifier (e.g., uniquely identifying the video game segment with which the event or data item is associated), and a segment attribute identifier 1010 (e.g., identifying an attribute, such as a character, a scene, a sport, or the like, with which the event or data item is associated).

FIG. 10 also shows an example data structure 1002 of associations between corresponding content items, content attributes, video games, and video game segments. Such data structures 1002 may be generated and/or updated in metadata database 110 by control circuitry 302 as more gaming logs are aggregated and more content is determined to be associated with video games and/or video game segments based on having attributes in common. Each item of the data structure 1002 includes a content identifier 1012 (e.g., uniquely identifying a content item, such as a song, a clip of a movie scene, a clip from a real-world sporting event, or the like), a content attribute identifier 1014 (e.g., identifying an attribute, such as a character, scene, or sport featured in the content item), a video game identifier 1016 (e.g., identifying a video game that has previously been determined to be associated with the content item), and a game segment identifier 1018 (e.g., identifying a video game segment that has previously been determined to be associated with the content item). As described in further detail below in connection with FIG. 9, control circuitry 302 utilizes the content attributes indicated by content attribute identifier 1014 as criteria for identifying items of content (e.g., identified by content identifiers 1012) that are associated with video games and/or video game segments (e.g., as indicated by the associated video game identifier 1016 and/or video game segment identifier 1018).

At 802, control circuitry 302 receives from a computing device 104, a gaming log including a variety of types of data relating to video game activity under a user account. For instance, the gaming log may include a user profile (e.g., which may include a video game user account identifier, television or over-the-top media account details, or the like), game details (e.g., which may include a name of a game, a game version, a game level a user is currently advanced to, or the like), game milestone status (e.g., which may indicate that a user has completed milestone 1, level 6, of a game, and retried level 7 of the game four times but has still not completed level 7), and/or the like. The gaming log may also include an identifier of a video game segment that a user is playing, will soon play, or has recently played via the computing device 104. The gaming log received at 802 also includes an identifier of an attribute that is associated with the video game segment. At 804, control circuitry 302 searches metadata in metadata database 110, based on the segment attribute received at 802, to identify an item of content, if any, that is associated with the video game segment.

In general, control circuitry 302 performs the search at 804 by attempting to match content attribute identifiers (and corresponding content identifiers) stored in metadata database 110 to one or more corresponding segment attributes received at 802. As noted above, the correspondence between content (or content identifiers) and attributes (or content attribute identifiers) is indicated by metadata stored in metadata database 110, for instance, according to data structure 1002. Additional details regarding how control circuitry 302 may identify an item of content at 804 are provided below in connection with FIG. 9. If an item of content is not identified as being associated with the video game segment ("NO" at 806), then control circuitry 302 returns data indicating that no item of content has been identified and the procedure 800 terminates. If an item of content is identified as being associated with the video game segment ("YES" at 806), then at 808 control circuitry 302 transmits, over communication network 106, a recommendation of the identified content item for display via computing device 104. At 812, control circuitry 302 determines whether the user has selected the recommended item of content for playback. If the user has not selected the recommended item of content for playback ("NO" at 812), then process 800 terminates. If the user has selected the recommended item of content for playback ("YES" at 812), then at 814 control circuitry 302 retrieves the identified item of content from content database 108 and transmits it over communication network 106 for playback via computing device 104. Procedure 800 then terminates.

Figure 9:
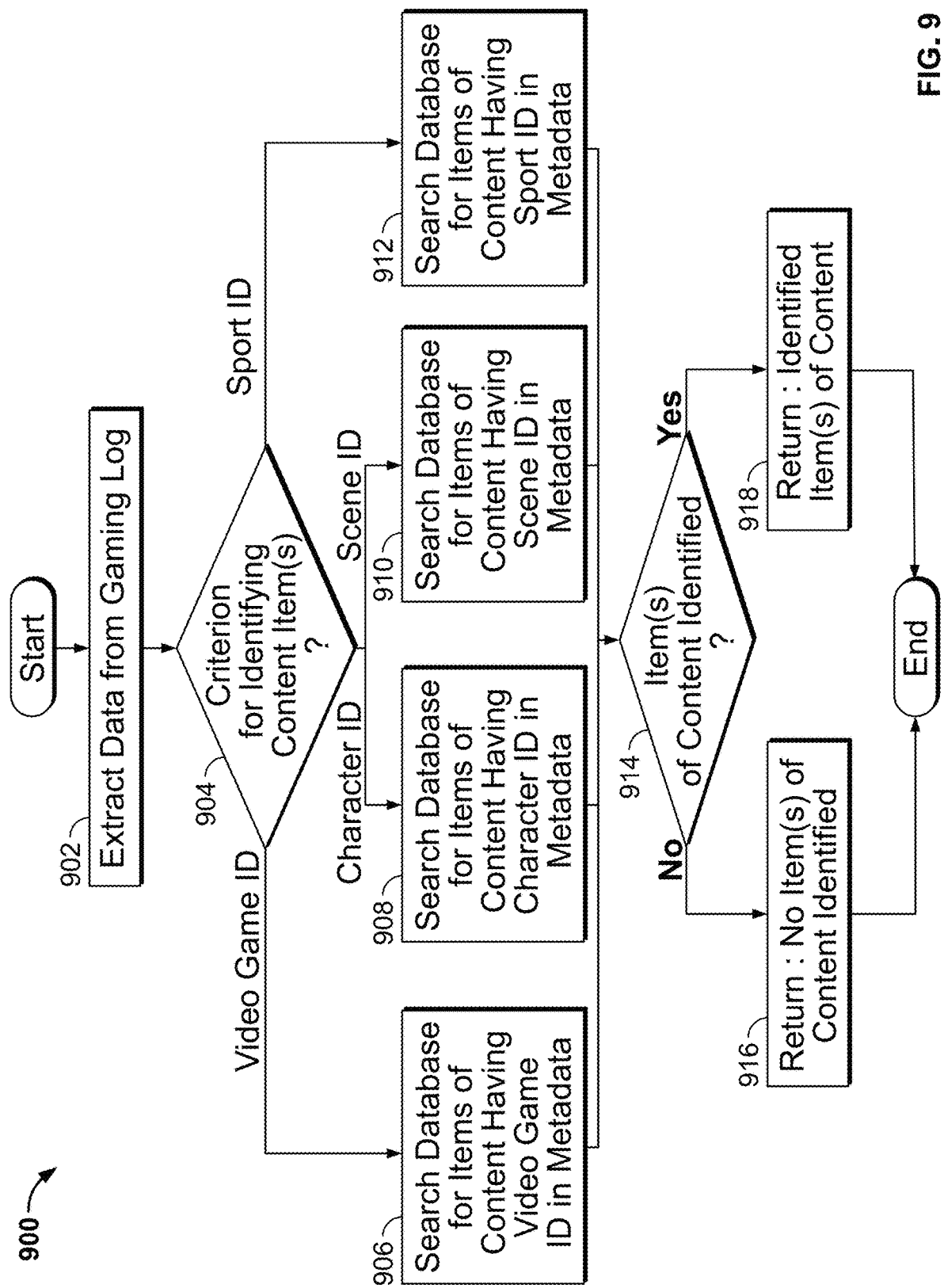
FIG. 9 depicts an illustrative flowchart of a process for searching metadata to identify content associated with a video game segment, in accordance with some embodiments of the disclosure.

FIG. 9 depicts an illustrative flowchart of a process 900 for searching metadata to identify content associated with a video game segment, in accordance with some embodiments of the disclosure. Process 900 corresponds to step 804 of FIG. 8 in some examples. At 902, control circuitry 302 extracts data from the gaming log received at 802. In various embodiments, control circuitry 302 uses one or more of a variety of types of attributes (e.g., indicated as being associated with the video game segment identified in the gaming log data received at 802) as criteria for identifying content items associated with data included in the gaming log.

Example types of attributes or criteria that control circuitry 302 may use for this purpose include a video game identifier, a character identifier, a scene identifier, a sport identifier, or any other type of identifier that may be used to associate a segment of a video game with corresponding content such as songs, clips of movie scenes, clips of real-world sporting events featuring a character and/or team that is featured in the video game segment, and/or user-uploaded video clips or game challenge tutorials.

At 904, control circuitry 302 determines which of one or more criterion are to be used as the basis for identifying content items associated with data included in the gaming log (e.g., associated with one or more video game segments identified in the gaming log). For example, control circuitry 302 may retrieve a rule from storage 304 to determine which criteria are to be used. Control circuitry 302 may additionally or alternatively determine which criteria are to be used by detecting whether certain types of data (e.g., a video game identifier, a character identifier, a scene identifier, a sport identifier, or the like) are included in the video gaming log. Although process 900 of FIG. 9 shows a single criterion being utilized based on a determination at 904, in various embodiments any combination of multiple criteria may be utilized to identify content items associated with the gaming log data.

In some examples, an item of content, such as a theme song or the like, may be related to a video game in general even if not uniquely related to a specific segment of the video game. In such an example, control circuitry 302 may utilize a video game identifier, which uniquely identifies a video game, as a criterion for identifying related content items. If a video game identifier is to be utilized to identify content items associated with the gaming log data ("VIDEO GAME ID" at 904), then at 906 control circuitry 302 searches metadata database 110 for metadata and an identifier of the corresponding content item—that matches the video game identifier extracted from the gaming log received at 902. In this manner, control circuitry 302 can identify an item of content, if any, that is associated with a video game in general, even if not associated (e.g., at least as indicated by data in metadata database 110) with a particular segment of the video game.

In another example, a video game segment may be related to (e.g., may feature) a character, such as a fictitious video game character, a character from a movie or other media content, a real-life character (e.g., a player of a professional sport) or the like. In such an example, control circuitry 302 utilizes a character identifier, which uniquely identifies a character, as a criterion for identifying one or more related content items. If a character identifier is to be utilized to identify content items associated with the gaming log data ("CHARACTER ID" at 904), then at 908 control circuitry 302 searches metadata database 110 for metadata—and an identifier of the corresponding content item—that matches the character identifier extracted from the gaming log received at 902. In this manner, control circuitry 302 can identify an item of content, if any, that is associated with a character—such as a fictitious video game character, a character from a movie or other media content, a real-life character (e.g., a player of a professional sport) or the like—that is featured in a video segment identified in the gaming log.

As yet another example, a video game segment may be related to a scene from a movie or other media content. For instance, a video game segment (or particular challenge) may mirror a scene from a corresponding movie. In such an example, control circuitry 302 may use a scene identifier, which uniquely identifies a scene from a movie or other media content that is related to the video game segment, as a criterion for identifying one or more related content items. If a scene identifier is to be utilized to identify content items associated with the gaming log data ("SCENE ID" at 904), then at 910 control circuitry 302 searches metadata database 110 for metadata—and an identifier of the corresponding content item—that matches the scene identifier extracted from the gaming log received at 902.

In another aspect, a video game segment may be related to a sport, such as football, baseball, basketball, or the like. For instance, the video game segment may relate to a particular video game matchup between two NFL football teams that have real-life counterparts. In such an example, control circuitry 302 utilizes a sport identifier (and/or one or more team identifiers, player identifiers, sporting event identifiers indicating an event that occurred during the video game play of the sport, or the like) as a criterion for identifying one or more related content items. If a sport identifier is to be utilized to identify content items associated with the gaming log data ("SPORT ID" at 904), then at 912 control circuitry 302 searches metadata database 110 for metadata—and an identifier of the corresponding content item—that matches the sport identifier extracted from the gaming log received at 902.

Although not shown in FIG. 9, in some embodiments, the gaming log includes an event identifier indicating an event, such as completion of a video gaming challenge or milestone, that occurred during the course of video game play, and control circuitry 302 utilizes the event identifier as a criterion for identifying content related to that video game segment. In this manner, control circuitry 302 may provide a recommendation of content that corresponds to gaming milestone a user recently achieved.

At 914, control circuitry determines whether an item of content is identified, at 906, 908, 910, or 912, as being associated with the video game segment extracted from the gaming log at 902. If an item of content is not identified as being associated with the video game segment ("NO" at 914), then control circuitry 302 returns data indicating that no item of content has been identified and the procedure 900 terminates. If an item of content is identified as being associated with the video game segment ("YES" at 914), then at 918 control circuitry 302 returns the content item identifier for the identified content item so that a recommendation of the item of content, or the content item itself, may be transmitted to computing device 104 for selection and/or playback.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending content based on a gaming log, comprising:
   receiving, from a computing device via communication network, a gaming log generated based on performance of a video game using the computing device, the gaming log comprising an identifier of a segment of the video game and an attribute of the segment;
   searching metadata associated with items of content in a database to identify, based on the identifier of the segment or the attribute of the segment, an item of content associated with the segment of the video game; and
   in response to identifying the item of content associated with the segment of the video game:
      transmitting, for display via the computing device, a recommendation of the identified item of content,
      wherein the item of content associated with the segment of the video game comprises a video clip of a scene from a movie or television show associated with the segment.

2. The method of claim 1,
   wherein the attribute of the segment comprises an identifier of the video game, and
   wherein the searching the metadata to identify the item of content associated with the segment of the video game comprises searching the database for the item of content associated with the identifier of the video game.

3. The method of claim 2, wherein the item of content comprises a video clip from a movie or television show associated with the segment of the video game.

4. The method of claim 1,
   wherein the attribute of the segment comprises an identifier of a character associated with the segment, and
   wherein the searching the metadata to identify the item of content comprises searching the database for the item of content associated with the identifier of the character associated with the segment.

5. The method of claim 4, wherein the item of content comprises a video clip featuring the character associated with the segment of the video game.

6. The method of claim 1,
   wherein the attribute of the segment comprises an identifier of the scene from the movie or television show associated with the segment, and
   wherein the searching the metadata to identify the item of content comprises searching the database for the item of content associated with the identifier of the scene from the movie or television show associated with the segment.

7. The method of claim 1,
   wherein the attribute of the segment comprises an identifier of a sport associated with the segment, and
   wherein the searching the metadata to identify the item of content comprises searching the database for the item of content associated with the identifier of the sport associated with the segment of the video game.

8. The method of claim 7, wherein the item of content associated with the segment of the video game comprises a video clip featuring the sport associated with the segment.

9. The method of claim 1, further comprising:
   receiving, over the communication network, selection of the recommended item of content; and in response to receiving the selection of the recommended item of content:
    transmitting, for display via the computing device, the recommended item of content.

10. A system for recommending content based on a gaming log, comprising:
    a communication port configured to receive, from a computing device via communication network, a gaming log generated based on performance of a video game using the computing device, the gaming log comprising an identifier of a segment of the video game and an attribute of the segment;
    a database configured to store metadata associated with items of content; and
    control circuitry configured to:
        search the metadata associated with items of content in the database to identify, based on the identifier of the segment or the attribute of the segment, an item of content associated with the segment of the video game; and
        in response to identifying the item of content associated with the segment of the video game:
            transmit, for display via the computing device, a recommendation of the identified item of content,
            wherein the item of content associated with the segment of the video game comprises a video clip of a scene from a movie or television show associated with the segment.

11. The system of claim 10,
    wherein the attribute of the segment comprises an identifier of the video game, and
    wherein the control circuitry is further configured to search the metadata to identify the item of content associated with the segment of the video game by searching the database for the item of content associated with the identifier of the video game.

12. The system of claim 11, wherein the item of content comprises a video clip from a movie or television show associated with the segment of the video game.

13. The system of claim 10,
    wherein the attribute of the segment comprises an identifier of a character associated with the segment, and
    wherein the control circuitry is further configured to search the metadata to identify the item of content by searching the database for the item of content associated with the identifier of the character associated with the segment.

14. The system of claim 13, wherein the item of content comprises a video clip featuring the character associated with the segment of the video game.

15. The system of claim 10,
    wherein the attribute of the segment comprises an identifier of the scene of the movie or television show associated with the segment, and
    wherein the control circuitry is further configured to search the metadata to identify the item of content by searching the database for the item of content associated with the identifier of the scene of the movie or television show associated with the segment.

16. The system of claim 10,
    wherein the attribute of the segment comprises an identifier of a sport associated with the segment, and
    wherein the control circuitry is further configured to search the metadata to identify the item of content by searching the database for the item of content associated with the identifier of the sport associated with the segment of the video game.

17. The system of claim 16, wherein the item of content associated with the segment of the video game comprises a video clip featuring the sport associated with the segment.

18. The system of claim 10,
    wherein the communication port is further configured to receive, over the communication network, selection of the recommended item of content; and
    the control circuitry is further configured to, in response to receiving the selection of the recommended item of content:
        transmit, for display via the computing device, the recommended item of content.

19. A method for recommending content based on a gaming log, comprising:
    receiving, from a computing device via communication network, a gaming log generated based on performance of a video game using the computing device, the gaming log comprising an identifier of a segment of the video game and an attribute of the segment;
    searching metadata associated with items of content in a database to identify, based on the identifier of the segment or the attribute of the segment, an item of content associated with the segment of the video game; and
    in response to identifying the item of content associated with the segment of the video game:
transmitting, for display via the computing device, a recommendation of the identified item of content,
    wherein the attribute of the segment comprises an identifier of a character associated with the segment, the searching the metadata to identify the item of content comprises searching the database for the item of content associated with the identifier of the character associated with the segment, and the item of content comprises a video clip featuring the character associated with the segment of the video game.

20. A method for recommending content based on a gaming log, comprising:
    receiving, from a computing device via communication network, a gaming log generated based on performance of a video game using the computing device, the gaming log comprising an identifier of a segment of the video game and an attribute of the segment;
    searching metadata associated with items of content in a database to identify, based on the identifier of the segment or the attribute of the segment, an item of content associated with the segment of the video game; and
    in response to identifying the item of content associated with the segment of the video game:
transmitting, for display via the computing device, a recommendation of the identified item of content,
    wherein the attribute of the segment comprises an identifier of a sport associated with the segment, the searching the metadata to identify the item of content comprises searching the database for the item of content associated with the identifier of the sport associated with the segment of the video game, and the item of content associated with the segment of the video game comprises a video clip featuring the sport associated with the segment.

21. A system for recommending content based on a gaming log, comprising:
    a communication port configured to receive, from a computing device via communication network, a gaming log generated based on performance of a video game using the computing device, the gaming log comprising an identifier of a segment of the video game and an attribute of the segment;
a database configured to store metadata associated with items of content; and
control circuitry configured to:
search the metadata associated with items of content in the database to identify, based on the identifier of the segment or the attribute of the segment, an item of content associated with the segment of the video game; and
in response to identifying the item of content associated with the segment of the video game:
transmit, for display via the computing device, a recommendation of the identified item of content,
wherein the attribute of the segment comprises an identifier of a character associated with the segment, the control circuitry is further configured to search the metadata to identify the item of content by searching the database for the item of content associated with the identifier of the character associated with the segment, and the item of content comprises a video clip featuring the character associated with the segment of the video game.

22. A system for recommending content based on a gaming log, comprising:
a communication port configured to receive, from a computing device via communication network, a gaming log generated based on performance of a video game using the computing device, the gaming log comprising an identifier of a segment of the video game and an attribute of the segment;
a database configured to store metadata associated with items of content; and
control circuitry configured to:
search the metadata associated with items of content in the database to identify, based on the identifier of the segment or the attribute of the segment, an item of content associated with the segment of the video game; and
in response to identifying the item of content associated with the segment of the video game:
transmit, for display via the computing device, a recommendation of the identified item of content,
wherein the attribute of the segment comprises an identifier of a sport associated with the segment, the control circuitry is further configured to search the metadata to identify the item of content by searching the database for the item of content associated with the identifier of the sport associated with the segment of the video game, and the item of content associated with the segment of the video game comprises a video clip featuring the sport associated with the segment.

* * * * *